United States Patent [19]
Jeon et al.

[11] Patent Number: 5,682,021
[45] Date of Patent: Oct. 28, 1997

[54] HOWLING PHENOMENA REMOVING APPARATUS FOR VIDEO DISPLAY APPLIANCES

[75] Inventors: Chang Wook Jeon; Seok Hwa Jeong, both of Kumi, Rep. of Korea

[73] Assignee: LG Electronics, Inc., Seoul, Rep. of Korea

[21] Appl. No.: 645,642

[22] Filed: May 16, 1996

[30] Foreign Application Priority Data

Jun. 14, 1995 [KR] Rep. of Korea ............ 95-15787
Aug. 28, 1995 [KR] Rep. of Korea ............ 95-26888

[51] Int. Cl.$^6$ ............................................. H04R 7/00
[52] U.S. Cl. ........................ 181/166; 181/199; 181/20.7
[58] Field of Search ........................ 181/151, 166, 181/207, 208, 209, 199, 141; 381/24, 88, 158, 162, 188, 189, 205; 312/7.2

[56] References Cited

U.S. PATENT DOCUMENTS

| | | | |
|---|---|---|---|
| 3,086,078 | 4/1963 | Sharma | 312/7.2 |
| 3,571,509 | 3/1971 | Cross | 312/7.2 X |
| 4,152,544 | 5/1979 | Sanpei et al. | 181/199 |
| 5,036,946 | 8/1991 | Yoshino | 312/7.2 |
| 5,162,619 | 11/1992 | Thiele et al. | 181/166 |
| 5,400,408 | 3/1995 | Lundgren et al. | 381/88 |

FOREIGN PATENT DOCUMENTS

| | | |
|---|---|---|
| 2297010 | 7/1996 | United Kingdom . |
| 8602508 | 5/1986 | WIPO . |
| 9501077 | 1/1995 | WIPO . |

*Primary Examiner*—Khanh Dang
*Attorney, Agent, or Firm*—Oppenheimer Poms Smith

[57] ABSTRACT

The present invention relates to an apparatus that removes howling phenomena in a video display appliance capable of absorbing and damping vibrations arising from the output of a loudspeaker to remove the howling phenomena produced by the transfer of the vibrations to a cathode-ray tube. The apparatus includes a vibration-absorbing section mounted on the loudspeaker for absorbing vibrations generated and propagated from the loudspeaker due to the output of the loudspeaker, and a vibration-damping section having a predetermined space for receiving the vibration-absorbing section therein. The vibration-damping section disperses and damps the remaining vibrations passing through the vibration-absorbing section in the space.

12 Claims, 6 Drawing Sheets

HOWLING PHENOMENA REMOVING APPARATUS FOR VIDEO DISPLAY APPLIANCES

BACKGROUND OF THE INVENTION

1. Field of the Invention

The present invention relates to an apparatus that removes howling phenomena in a video display appliance. In particular, the present invention relates to an apparatus associated with a video display appliance which can absorb and damp vibrations arising from the output of a loudspeaker, and thus remove the howling phenomena produced by the transfer of the vibrations directly to a cathode-ray tube.

2. Description of the Prior Art

Video display appliances such as monitors, televisions, etc., are typically provided with a cathode-ray tube (CRT). Such video display appliances are also provided with at least one loudspeaker for the output of sound.

FIG. 1 is a sectional view illustrating the structure of a conventional video display appliance in which a loudspeaker is installed. Referring to FIG. 1, a lug 3 of a CRT 2 is fastened to a cabinet. Also, a loudspeaker 6 is fastened to another cabinet boss 5 by a fastening screw 4 to fix the CRT 2 to a cabinet boss 8 by a fastening screw 7 to fix the loudspeaker 6 to the cabinet 1. Preferably, a plurality of loud speakers 6 may be installed in predetermined positions of the cabinet to cause a surround-sound effect.

In the conventional video display appliance as constructed above, a video signal is displayed on the CRT 2, while a sound signal is outputted by the loudspeaker 6.

The sound waves produced from the loudspeaker 6 are composed of vibration components, and such vibrations are directly transferred to the CRT 2 through solid state media. This causes the howling phenomena to be produced on the screen of the CRT 2.

Specifically, in the event that the sound produced from the loudspeaker 6 becomes louder or several loudspeakers are provided in the video display appliance, greater vibrations are generated to intensify the howling phenomena produced on the screen of the CRT 2.

According to the conventional video display appliance, the CRT 2 and the loudspeaker 6 are directly fixed to the cabinet 1 to form a single bodied frame structure, and thus the vibrations produced from the loudspeaker 6 are not suppressed, but are directly transferred to the CRT 2.

Specifically, the vibrations produced from the loudspeaker 6 are transferred to the cabinet 1 through the screw 7 and the boss 8, and then are transferred to the CRT 2 through a cushion portion 1a of the CRT 2.

On the other hand, the vibrations produced from the loudspeaker 6 are also transferred to a panel 2a of the CRT 2 through another path composed of the boss 5, screw 4, and lug 3, and then to a shadow mask 2c through a frame 2b. At this time, three electron beams for red, green, and blue colors, which are emitted from electron guns 2d, are directed to the fluorescent screen of the CRT 2 through beam-passing apertures provided in the shadow mask 2c. If the vibrations are transferred to the shadow mask 2c through the frame 2b, the electron beams, which are emitted to the fluorescent screen of the CRT 2 through the beam-passing apertures of the shadow mask 2c, are affected by the transferred vibrations, thereby producing the howling phenomena on the display screen of the CRT 2.

The howling phenomena deteriorates the picture quality and the reliability of the appliance. Also, it fatigues the user's eyes easily.

SUMMARY OF THE INVENTION

It is an object of the present invention to solve the problems involved in the prior art, and to provide a howling phenomena removing apparatus for a video display appliance which can absorb and damp vibrations generated due to the output of a loudspeaker and thus remove the howling phenomena produced by the transfer of the vibrations directly to a cathode-ray tube(CRT).

In order to achieve the above object, the present invention provides an apparatus that removes howling phenomena in a video display appliance having a CRT for displaying a video signal thereon, at least one loudspeaker for outputting a sound signal, and a cabinet for fixing the CRT and the loudspeaker thereto, the howling phenomena removing apparatus comprising:

vibration-absorbing means, mounted on the loudspeaker, for absorbing vibrations generated and propagated from the loudspeaker due to an output of the loudspeaker; and vibration-damping means having a predetermined space for receiving the vibration-absorbing means therein, the vibration-damping means dispersing and damping the remaining vibrations passing through the vibration-absorbing means through the space.

BRIEF DESCRIPTION OF THE DRAWINGS

The above object, other features and advantages of the present invention will become more apparent by describing the preferred embodiments thereof with reference to the accompanying drawings, which.

DETAILED DESCRIPTION OF THE PREFERRED EMBODIMENTS

FIGS. 2, 3, 4A, and 4B show the howling phenomena removing apparatus for a video display appliance according to one embodiment of the present invention.

Figure 2:
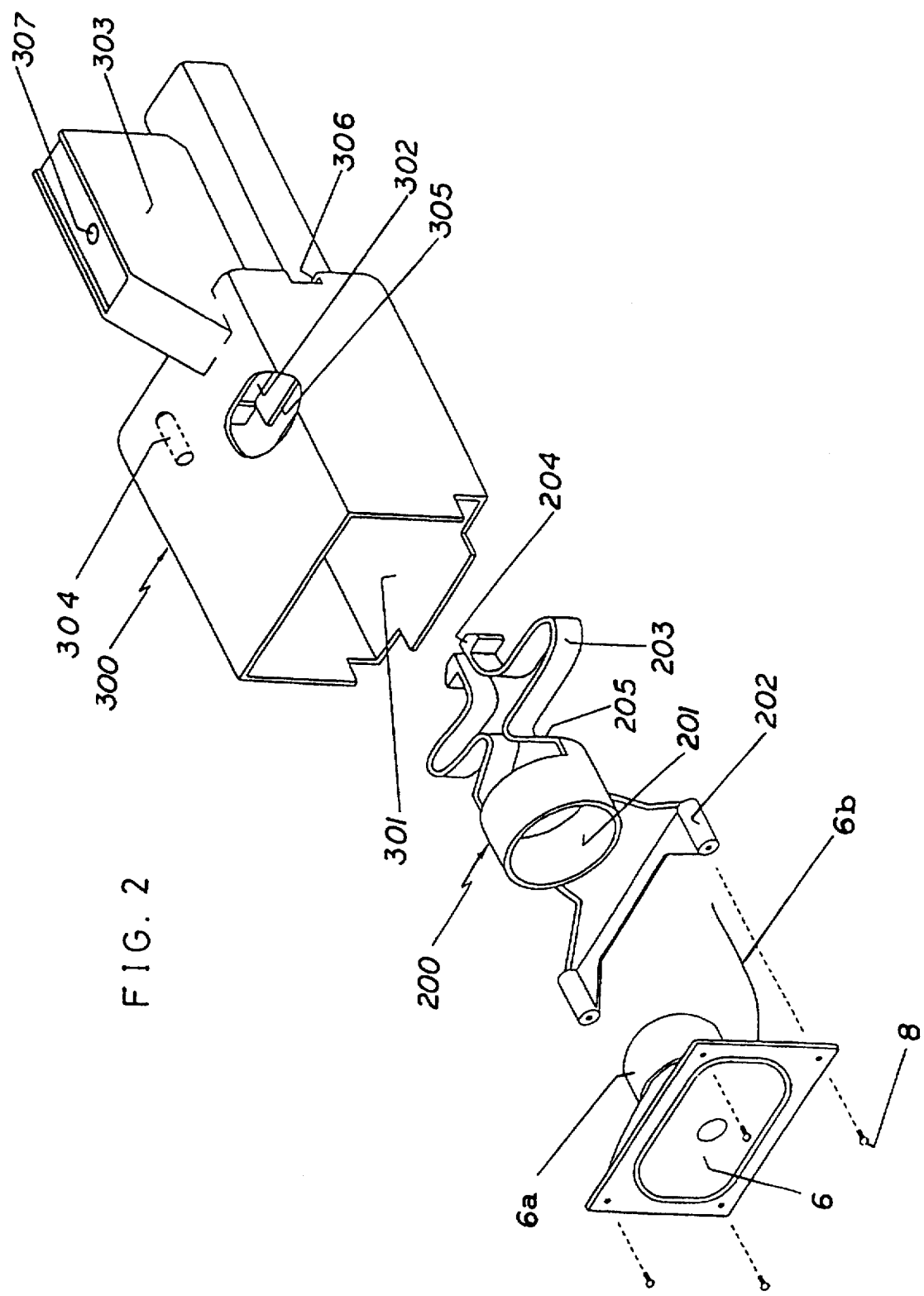
FIG. 2 is an exploded perspective view of the howling phenomena removing apparatus for a video display appliance according to one embodiment of the present invention.

Referring to FIG. 2, the howling phenomena removing apparatus according to one embodiment of the present invention comprises a CRT 2, a loudspeaker 6, a cabinet 1 for fixing the CRT 2 and the loudspeaker 6 thereto, a vibration-absorbing section 200, mounted on the loudspeaker 6, for absorbing vibrations generated from the loudspeaker 6 due to the output of the loudspeaker 6, and a vibration-damping section 300 having a predetermined space for receiving the vibration-absorbing section 200 therein and damping the remaining vibrations passing through the vibration-absorbing section 200 through the space.

The vibration-absorbing section 200 is provided with a cylindrical holder portion 201 for holding a yoke portion of the loudspeaker 6 therein, a pair of first fixing projections 202 extending forwardly from the holder portion 201 so as to be fastened to a frame portion of the loudspeaker 6 by a fastening screw 8, a pair of first supporting ribs 205 extending backwardly from the holder portion 201, an elastic absorbing rib portion 203, extending backwardly from the first supporting ribs 205, for absorbing the vibrations propagated from the loudspeaker 6 by its own elasticity, a latch portion 204 formed on end portions of the elastic absorbing rib portion 203, and elastically interlocked with the vibration-damping section 300.

In the embodiment, the elastic absorbing rib portion 203, is composed of two symmetrical leaf-type ribs having bent portions to disperse and damp the vibrations transferred to the holder portion 201.

The vibration-damping section 300 is provided with a housing 301 for receiving the vibration-absorbing section 200 therein with a predetermined space, a fastening hole 302, formed on a rear wall of the housing 301, for receiving and being elastically interlocked with the latch portion 204 formed on the end portions of the elastic absorbing rib portion 203 of the vibration-absorbing section 200, a connection portion 303 and second fixing projections 304 extending from the rear wall of the housing 301 to be fixed to a main bracket (not illustrated) in the video display appliance.

The vibration-damping section 300 is also provided with a second supporting rib 305, formed around the periphery of the fastening hole 302, for supporting the latch portion 204 of the vibration-absorbing section 200 to prevent the elastic absorbing rib portion 203 from drooping downwardly due to its own weight.

The housing 301 of the vibration-damping section 300 has an opening formed on the rear wall of the housing 301, for drawing therethrough lead wires 6b of the loudspeaker 6 which is fixed to the vibration-absorbing section 200.

In the drawings, the numeral 307 denotes a fixing hole formed on the connection portion 303 to fix the housing 301 to the main bracket in the video display appliance.

Figure 1:
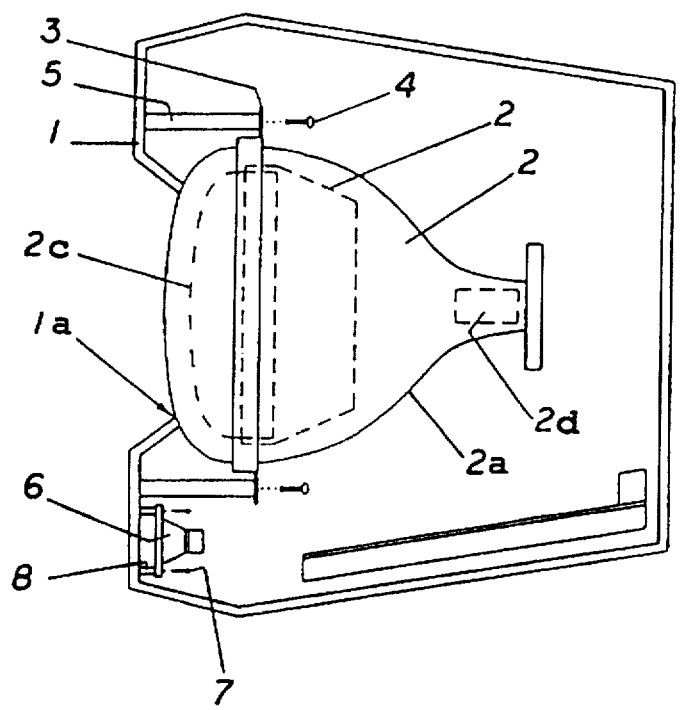
FIG. 1 is a sectional view illustrating the structure of a conventional video display appliance in which a loudspeaker is installed.
Figure 3:
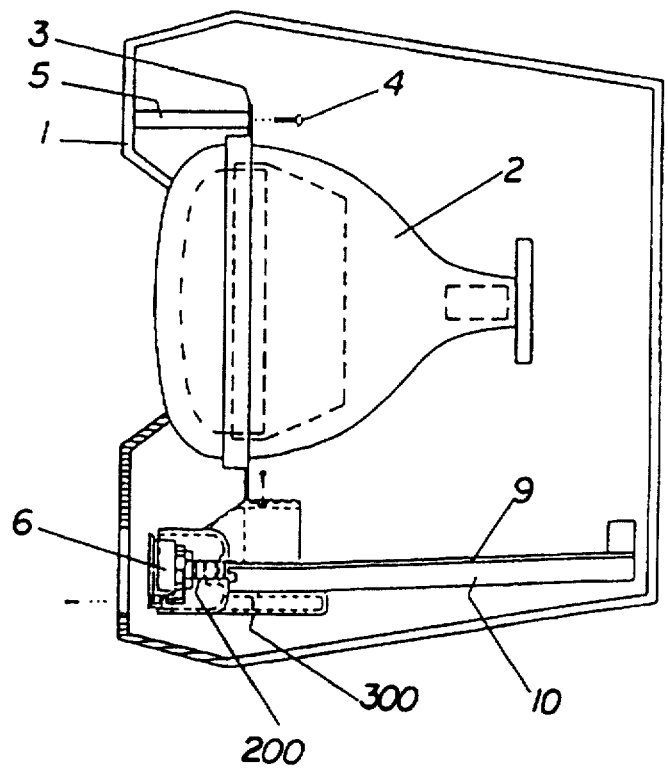
FIG. 3 is a sectional view illustrating the video display appliance incorporating the apparatus of FIG. 2.
Figure 4A:
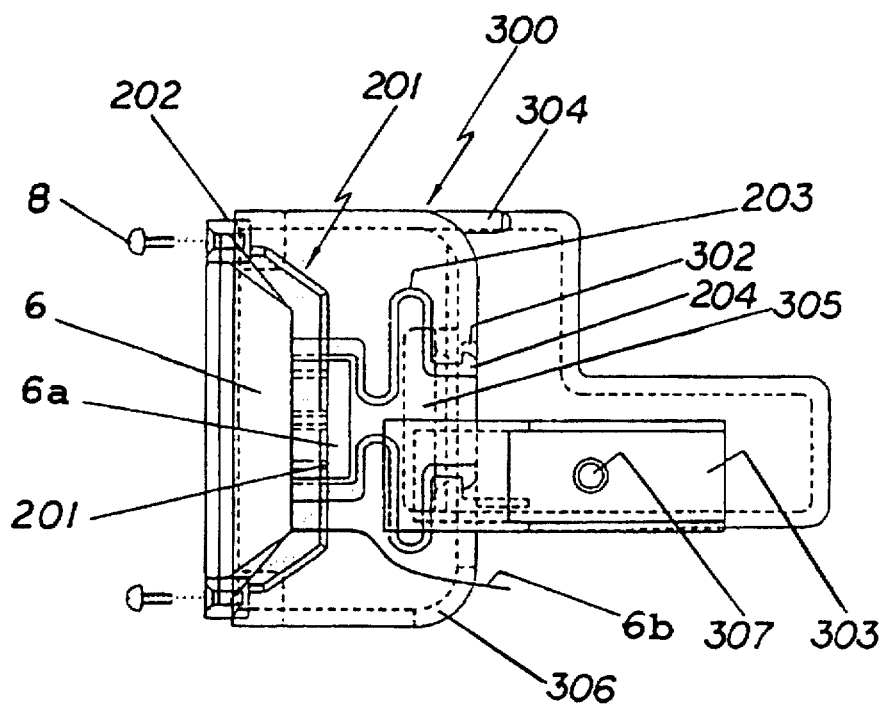
FIGS. 4A and 4B are sectional views illustrating in detail the vibration-absorbing section and vibration-damping section in the apparatus of FIG. 2.
Figure 4B:
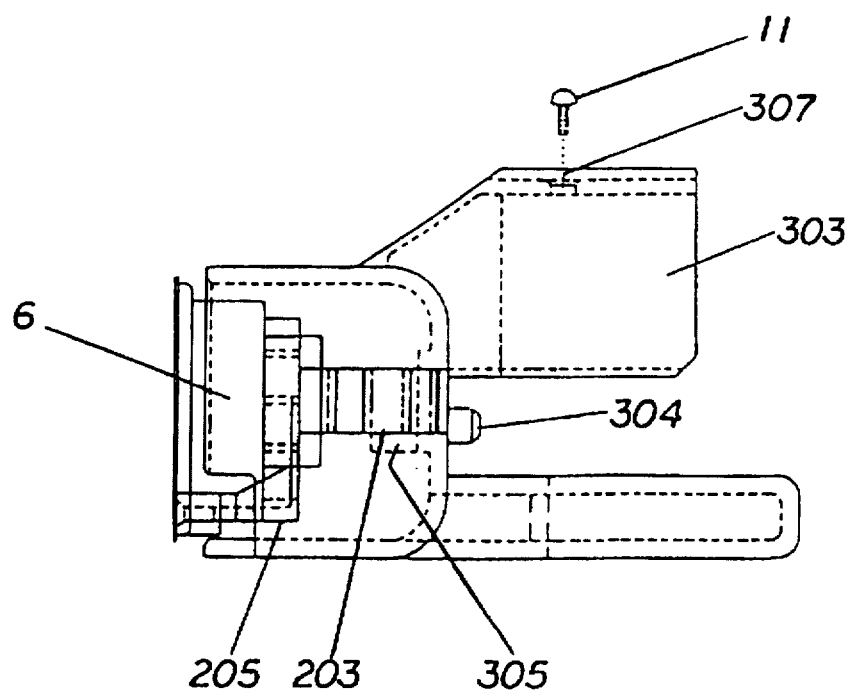

FIG. 3 shows the video display appliance incorporating the howling phenomena removing apparatus according to one embodiment of the present invention as constructed above, and FIGS. 4A and 4B show the apparatus of FIG. 3 to which a loudspeaker is fastened.

Referring to FIGS. 3, 4A, and 4B, the loudspeaker 6 is not directly fixed to the cabinet 1, but is fastened by a fastening screw 11 to a bracket 10, which is secured with a main circuit board 9, via the vibration-absorbing section 200 and the vibration-damping section 300.

Accordingly, the vibrations produced from the loudspeaker 6 are firstly absorbed through the vibration-absorbing section 200, and then the remaining vibrations are dispersed and damped in the housing 301 of the vibration-damping section 300.

Specifically, the vibrations produced from the loudspeaker 6 are transferred to the holder portion 201 through the fixing projections 202 and the fastening screw 8. The vibrations transferred to the holder portion 201 pass through the first supporting ribs 205 extending backwardly from the holder portion 201, and then are propagated along the elastic absorbing rib portion 203. During the propagation through the elastic absorbing rib portion 203, the vibrations are buffered and absorbed by the elasticity of the elastic absorbing rib portion 203.

At the same time, since the vibration-absorbing section 200 is received in the housing 301 of the vibration-damping section 300 with the predetermined space, the remaining vibrations passing through the vibration-absorbing section 200 are dispersed and suppressed in the space of the housing 301.

Also, the vibrations transferred through the latching structure, in which the latch portion 204 formed on the ends of the elastic absorbing rib portion 203 is interlocked and fits into the fastening hole 302 of the vibration-damping section 300, are also absorbed and suppressed by the structure since the latching structure is loose-fitting in comparison to a screw-fastened structure. The suppressed vibrations are then transferred to the main bracket 10 which is fixed to the connection portion 303 and the second fixing projections 304.

However, the remaining vibrations reaching the main bracket 10 are almost extinguished by means of the vibration absorbing and damping structure as described above, and do not affect the operation of the CRT 2.

Meanwhile, the second supporting rib 305 of the vibration-damping section 300 supports the latch portion 204 and the elastic absorbing rib portion 203 to prevent them from drooping downwardly. The lead wires 6b of the loudspeaker 6 are drawn through the opening 306 formed on the housing 301, and connected to the main circuit board 9.

Figure 5:
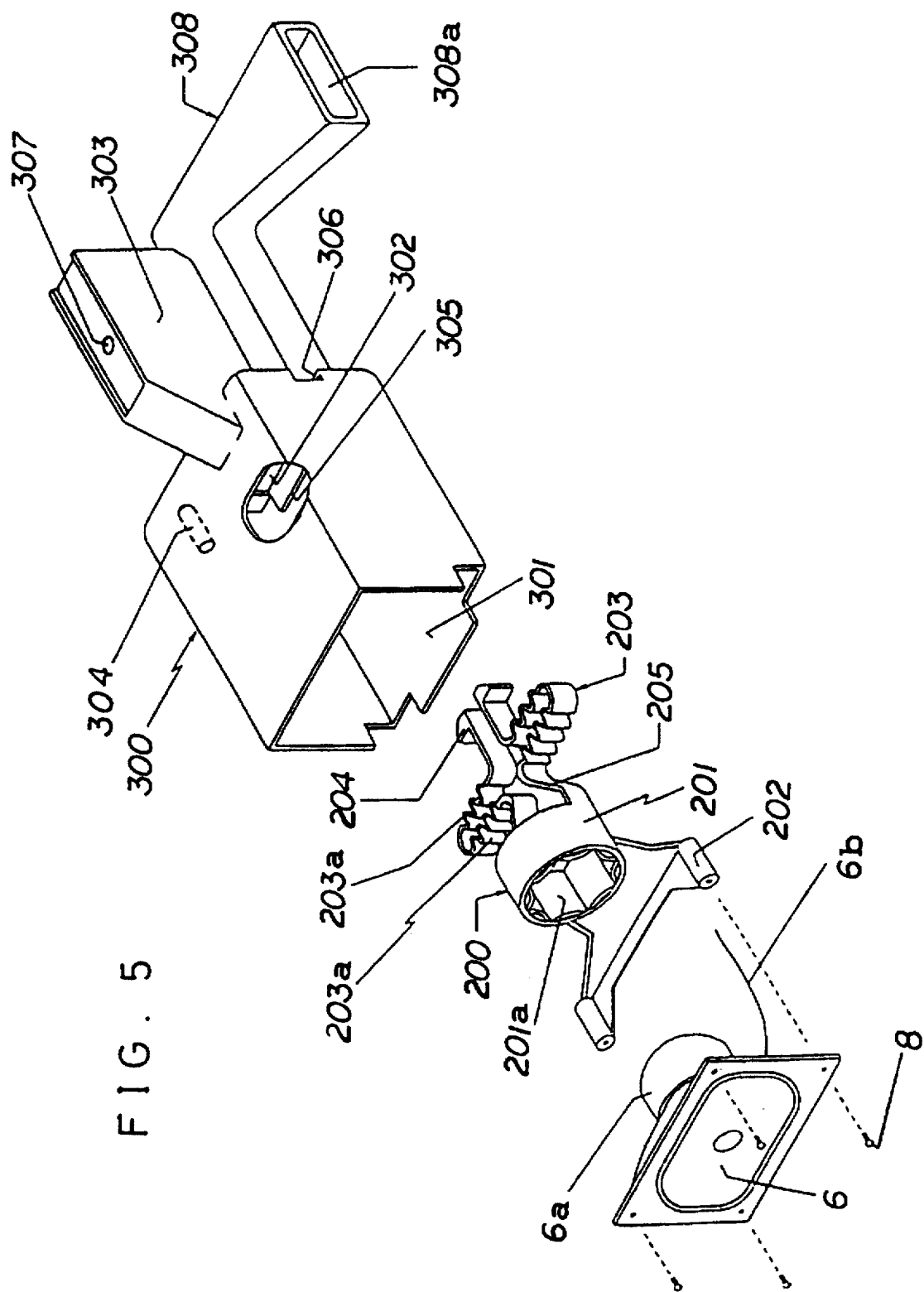
FIG. 5 is an exploded perspective view of the howling phenomena removing apparatus for a video display appliance according to another embodiment of the present invention.
Figure 6:
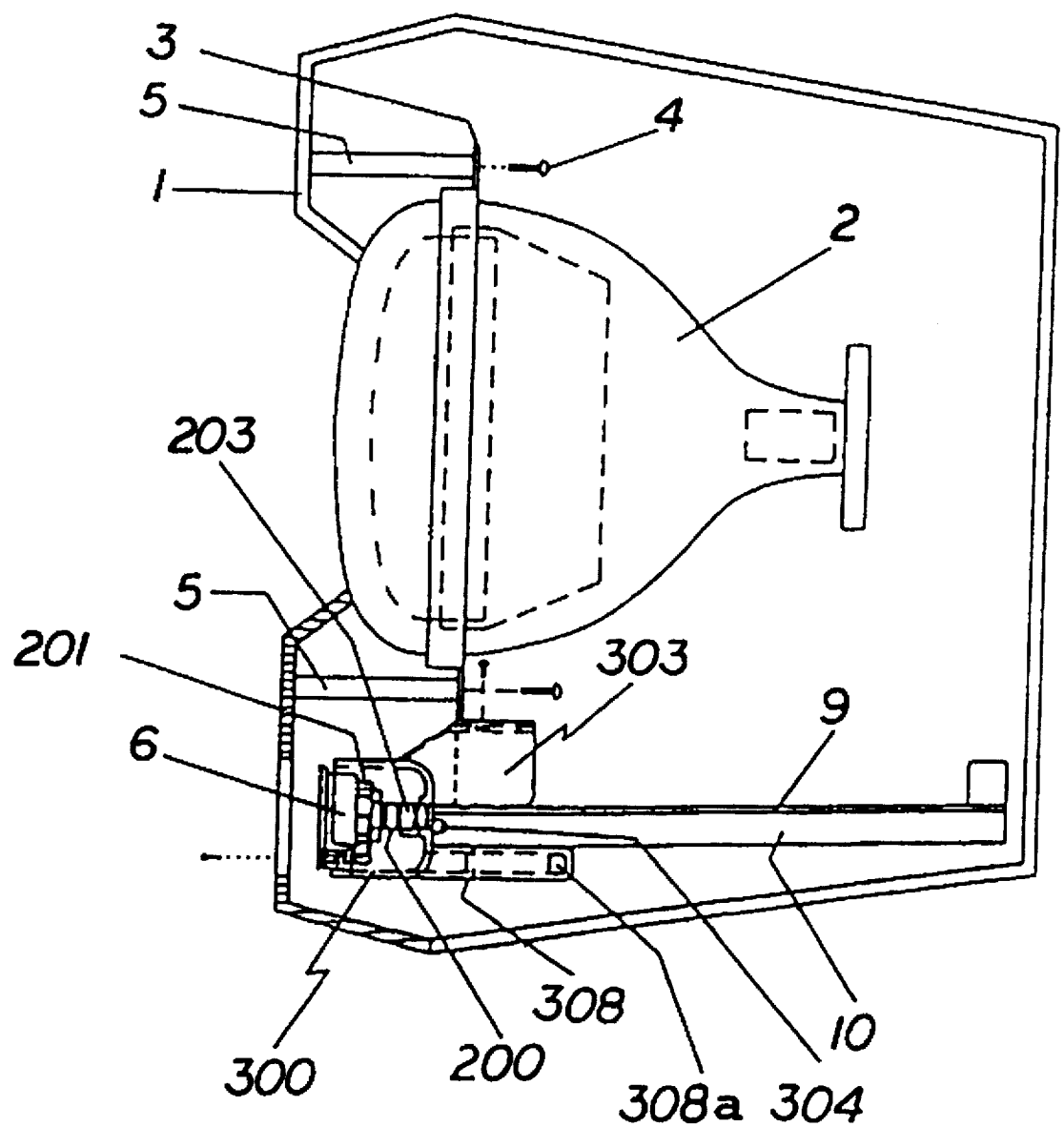
FIG. 6 is a sectional view illustrating the video display appliance incorporating the apparatus of FIG. 5.
Figure 7:
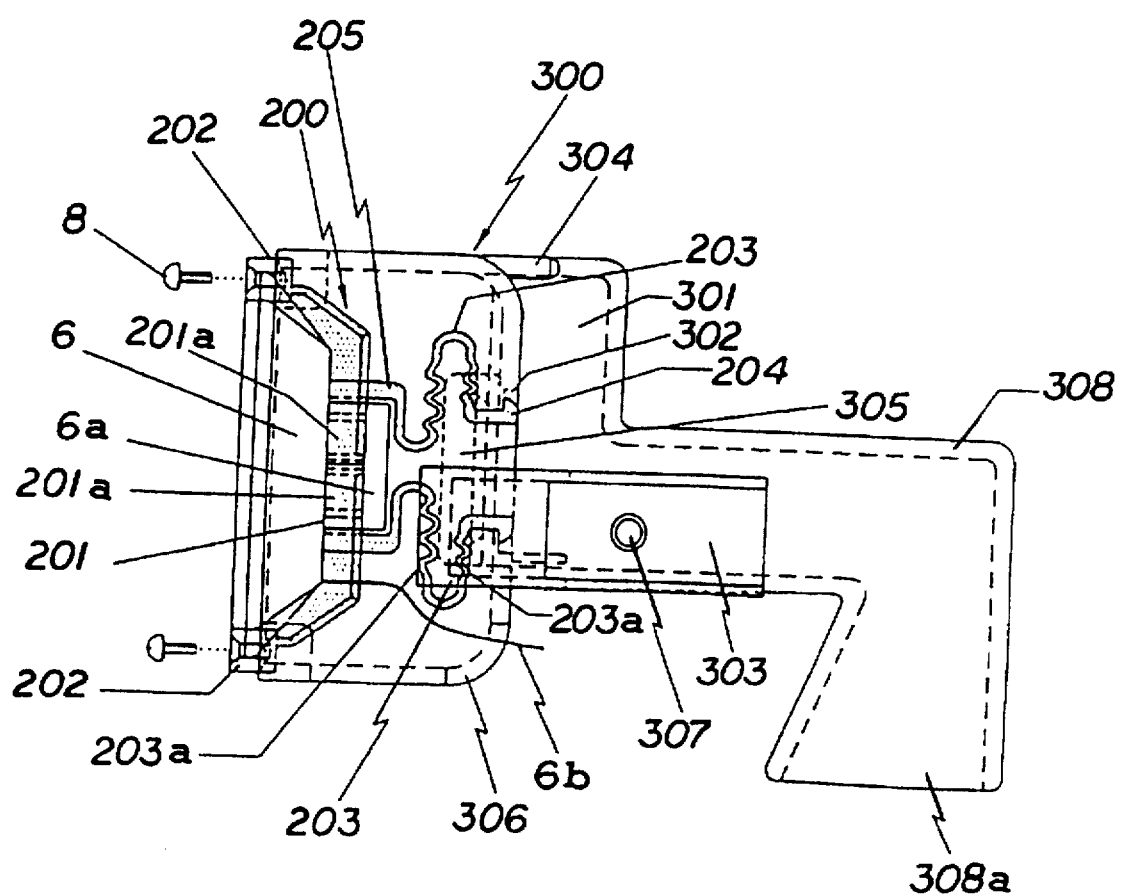
FIG. 7 is a sectional view illustrating in detail the vibration-absorbing section and vibration-damping section in the apparatus of FIG. 5.

FIGS. 5, 6, and 7 show the howling phenomena removing apparatus for a video display appliance according to another embodiment of the present invention.

Referring to FIG. 5, the howling phenomena removing apparatus according to another embodiment of the present invention comprises a CRT 2, a loudspeaker 6, a cabinet 1 for fixing the CRT 2 and the loudspeaker 6 thereto, a vibration-absorbing section 200, mounted on the loudspeaker 6, for absorbing vibrations generated from the loudspeaker 6 due to the output of the loudspeaker 6, and a vibration-damping section 300 having a predetermined space for receiving the vibration-absorbing section 200 therein and damping the remaining vibrations passing through the vibration-absorbing section 200 through the space.

The vibration-absorbing section 200 is provided with a holder portion 201 for holding a yoke portion 6A of the loudspeaker 6 therein, the holder portion 201 being provided with a plurality of first elastic absorbing ribs 201a installed on the inner circumference of the holder portion 201, a pair of first fixing projections 202 extending forwardly from the holder portion 201 so as to be fastened to a frame portion of the loudspeaker 6 by a fastening screw 8, a pair of first supporting ribs 205 extending backwardly from the holder portion 201, a second elastic absorbing rib portion 203, extending backwardly from the first supporting ribs 205 and having a plurality of wrinkle-shaped bent portions to absorb the vibrations propagated from the loudspeaker 6 by its own elasticity, a latch portion 204 formed on end portions of the elastic absorbing rib portion 203, and elastically interlocked with the vibration-damping section 300.

In this embodiment, the holder portion 201 has a cylindrical shape to hold the yoke portion 6A of the loudspeaker 6. On the inner circumference of the holder portion 201, the second elastic absorbing rib portion 203 having a plurality of bent portions is mounted to absorb the vibrations propagated from the loudspeaker 6. The first supporting ribs 205, which serves to interconnect the holder portion 201 and the elastic absorbing rib portion 203 together, is composed of two leaf-type elastic ribs to disperse and damp the vibrations transferred to the holder portion 201. The elastic absorbing rib portion 203 extends from the first supporting ribs 205, and is composed of two symmetrical elastic ribs having a plurality of wrinkle-shaped bent portions, respectively, as shown in FIG. 5.

The vibration-damping section 300 is provided with a housing 301 for receiving the vibration-absorbing section 200 therein with a predetermined space, a fastening hole 302, formed on a rear wall of the housing 301, for being elastically interlocked with the latch portion 204 of the vibration-absorbing section 200, a connection portion 303 and second fixing projections 304 extending from the rear wall of the housing 301 to be fixed to a main bracket (not illustrated), and a remaining vibration discharging duct 308 extending from the housing 301 to discharge the remaining vibrations out of the cabinet 1.

The vibration-damping section 300 is also provided with a second supporting rib 305, formed around the periphery of the fastening hole 302, for supporting the latch portion 204 of the vibration-absorbing section 200 to prevent the elastic absorbing rib portion 203 from drooping downwardly due to its own weight.

The housing 301 of the vibration-damping section 300 has an opening, formed on the rear wall of the housing 301, for drawing therethrough lead wires 6b of the loudspeaker 6 which is fixed to the vibration-absorbing section 200.

In the drawings, the numeral 307 denotes a fixing hole formed on the connection portion 303 to fix the housing 301 to the main bracket in the video display appliance.

FIG. 6 shows the video display appliance incorporating the howling phenomena removing apparatus according to another embodiment of the present invention as constructed above, and FIG. 7 shows the apparatus of FIG. 6 to which a loudspeaker is fastened.

Referring to FIGS. 6 and 7, the loudspeaker 6 is not directly fixed to the cabinet 1, but is fastened by the fastening screw 11 to the bracket 10, which is secured with the main circuit board 9, via the vibration-absorbing section 200 and the vibration-damping section 300.

Accordingly, the vibrations produced from the loudspeaker 6 are firstly absorbed through the vibration-absorbing section 200, and then dispersed and damped in the housing 301 of the vibration-damping section 300. The remaining vibrations passing through the vibration-damping section 300 are discharged out of the cabinet 1 though the discharging duct 308.

Specifically, the vibrations produced from the loudspeaker 6 are transferred to the holder portion 201 through the fixing projections 202 and the fastening screw 8. The vibrations transferred to the holder portion 201 pass through the first supporting ribs 205 extending backwardly from the holder portion 201 and then are propagated in zigzag along the wrinkle-shaped bent portions of the elastic absorbing rib portion 203. During the propagation through the elastic absorbing rib portion 203, the vibrations are buffered and absorbed by the elasticity of the elastic absorbing rib portion 203.

At the same time, since the vibration-absorbing section 200 is received in the housing 301 of the vibration-damping section 300 with the predetermined space, the remaining vibrations passing through the vibration-absorbing section 200 are dispersed and suppressed in the space of the housing 301. Further, since the remaining vibration discharging duct 308 extends from the housing 301 to the outside of the cabinet 1, the vibrations remaining in the housing 301 is guided and discharged out of the cabinet 1 through the discharging duct 308.

Also, the vibrations transferred through the latching structure, in which the latch portion 204 formed on the ends of the elastic absorbing rib portion 203 is interlocked and fits into the fastening hole 302 of the vibration-damping section 300, are also absorbed and suppressed by the structure since the latching structure is loose-fitting in comparison to a screw-fastened structure. The suppressed vibrations are then transferred to the main bracket 10 which is fixed to the connection portion 303 and the second fixing projections 304.

However, the remaining vibrations reaching the main bracket 10 are almost extinguished by means of the vibration absorbing and damping structure as described above, and do not affect the operation of the CRT 2.

Meanwhile, the second supporting rib 305 of the vibration-damping section 300 supports the latch portion 204 and the elastic absorbing rib portion 203 to prevent them from drooping downwardly. The lead wires 6b of the loudspeaker are drawn through the opening 306 formed on the housing 301, and connected to the main circuit board 9.

From the foregoing, it will be apparent that the present invention provide the advantages in that it can absorb and damp vibrations generated due to the output of the loudspeaker, and thus remove the howling phenomena produced by the transfer of the vibrations directly to the CRT since the vibrations generated from the loudspeaker are absorbed, damped, and become almost extinct during their propagation through the vibration-absorbing section, vibration-damping section, and main bracket, thereby improving the picture quality and reliability of the product.

While the present invention has been described and illustrated herein with reference to the preferred embodiments thereof, it will be understood by those skilled in the art that various changes in form and details may be made therein without departing from the spirit and scope of the invention.

What is claimed is:

1. An apparatus for removing howling phenomena in a video display appliance having a cathode-ray tube for displaying a video signal thereon, at least one loudspeaker for outputting a sound signal, and a cabinet for fixing said cathode-ray tube and said loudspeaker thereto, said howling phenomena removing apparatus comprising:

vibration-absorbing means, mounted on said loudspeaker, for absorbing vibrations generated and propagated from said loudspeaker due to an output of said loudspeaker; and vibration-damping means having a predetermined space for receiving said vibration-absorbing means therein, said vibration-damping means dispersing and damping remaining vibrations passing through said vibration-absorbing means through said space.

2. A howling phenomena removing apparatus according to claim 1, wherein said vibration-absorbing means comprises:

holder means for holding a yoke portion of said loudspeaker therein to absorb said vibrations propagated form said yoke portion of said loudspeaker; and elastic absorbing means, coupled to said holder means, for absorbing said vibrations propagated from said holder means.

3. A howling phenomena removing apparatus according to claim 2, wherein said holder means has a cylindrical shape.

4. A howling phenomena removing apparatus according to claim 2, wherein said holder means comprises a plurality of elastic absorbing ribs installed on an inner circumference of said holder means.

5. A howling phenomena removing apparatus according to claim 2, wherein said holder means comprises first fixing projections extending from one end of said holder means so as to be fastened to a frame of said loudspeaker.

6. A howling phenomena removing apparatus according to claim 2, wherein said holder means comprises first supporting ribs extending from the other end of said holder means so as to be fastened to said elastic absorbing means.

7. A howling phenomena removing apparatus according to claim 2, wherein said elastic absorbing means comprises leaf-type elastic ribs extending from said holder means.

8. A howling phenomena removing apparatus according to claim 2, wherein said elastic absorbing means comprises two symmetrical elastic ribs extending from said holder means and having a plurality of wrinkle-shaped bent portions, respectively.

9. A howling phenomena removing apparatus according to claim 1, wherein said vibration-absorbing means comprises latch means extending therefrom, and said vibration-damping means comprises a fastening hole formed thereon which receives and is elastically interlocked with said latch means.

10. A howling phenomena removing apparatus according to claim 1, wherein said vibration-damping means comprises:

a housing for receiving said vibration-absorbing means therein with said predetermined space to disperse and damp therethrough said remaining vibrations passing through said vibration-absorbing means; and second fixing projections extending from said housing and serving to interconnect said vibration-damping means and said cabinet together.

11. A howling phenomena removing apparatus according to claim 10, wherein said vibration-damping means further comprises a second supporting rib which is formed thereon for supporting said vibration-absorbing means so as to prevent said vibration-absorbing means from drooping downwardly due to its own weight.

12. A howling phenomena removing apparatus according to claim 1, further comprising remaining vibration discharging means, formed on said vibration-damping means, for guiding and discharging said remaining vibrations passing through said vibration-damping means out of said cabinet.

* * * * *